United States Patent
Wong et al.

(10) Patent No.: US 10,171,504 B2
(45) Date of Patent: Jan. 1, 2019

(54) NETWORK ACCESS WITH DYNAMIC AUTHORIZATION

(71) Applicant: CISCO TECHNOLOGY, INC., San Jose, CA (US)

(72) Inventors: Pok Sze Wong, Santa Clara, CA (US); Ramesh Nampelly, Sunnyvale, CA (US); Aaron Rodriguez, Edinburg, TX (US)

(73) Assignee: Cisco Technology, Inc., San Jose, CA (US)

( * ) Notice: Subject to any disclaimer, the term of this patent is extended or adjusted under 35 U.S.C. 154(b) by 227 days.

(21) Appl. No.: 14/817,401

(22) Filed: Aug. 4, 2015

(65) Prior Publication Data

US 2017/0041343 A1 Feb. 9, 2017

(51) Int. Cl.
*H04L 29/06* (2006.01)

(52) U.S. Cl.
CPC ............ *H04L 63/20* (2013.01); *H04L 63/101* (2013.01); *H04L 63/102* (2013.01); *H04L 63/105* (2013.01); *H04L 63/107* (2013.01)

(58) Field of Classification Search
None
See application file for complete search history.

(56) References Cited

U.S. PATENT DOCUMENTS

| | | | |
|---|---|---|---|
| 7,490,347 B1 * | 2/2009 | Schneider | H04L 63/0815 713/157 |
| 7,738,403 B2 | 6/2010 | Ottamalika et al. | |
| 7,797,406 B2 * | 9/2010 | Patel | H04L 41/5022 709/220 |
| 2007/0189178 A1 | 8/2007 | Ottamalika et al. | |
| 2008/0271109 A1 * | 10/2008 | Singh | H04L 63/08 726/1 |
| 2010/0122333 A1 * | 5/2010 | Noe | H04L 63/0815 726/8 |
| 2013/0198808 A1 | 8/2013 | Thomson et al. | |
| 2014/0047114 A1 | 2/2014 | Chokshi et al. | |
| 2015/0012998 A1 | 1/2015 | Nellikar et al. | |
| 2015/0112933 A1 * | 4/2015 | Satapathy | G06F 17/30575 707/634 |
| 2015/0223109 A1 * | 8/2015 | Raleigh | H04L 41/0893 370/230 |

* cited by examiner

*Primary Examiner* — Malcolm Cribbs
*Assistant Examiner* — Andrew J Steinle
(74) *Attorney, Agent, or Firm* — Cindy Kaplan

(57) ABSTRACT

In one embodiment, a method includes receiving at an enforcement node, a request to access a network from an endpoint, transmitting at the enforcement node, the access request to a policy server, receiving at the enforcement node from the policy server, a dynamic authorization comprising a plurality of ranks, each of the ranks comprising a policy for access to the network by the endpoint, assigning the endpoint to one of the ranks and applying the policy associated with the rank to traffic received from the endpoint at the enforcement node during a communication session between the endpoint and the network, assigning the endpoint to a different rank, and applying the policy associated with the rank to traffic received from the endpoint during the communication session. An apparatus and logic are also disclosed herein.

20 Claims, 4 Drawing Sheets

NETWORK ACCESS WITH DYNAMIC AUTHORIZATION

TECHNICAL FIELD

The present disclosure relates generally to communication networks, and more particularly, to network access.

BACKGROUND

The security of today's networks has become increasingly important in the presence of growing technological complexity and heightened threats that can disrupt business and cause downtime. In order to secure and protect an organization's network and its connected resources, users are authenticated at the point of network attachment before allowing access to the network. Policy servers may be used, for example, to create and enforce network access policies for clients, connection request authentication, and connection request authorization. In conventional security systems, the authorization is static and any changes result in reauthentication, which impacts network processing and bandwidth resources.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
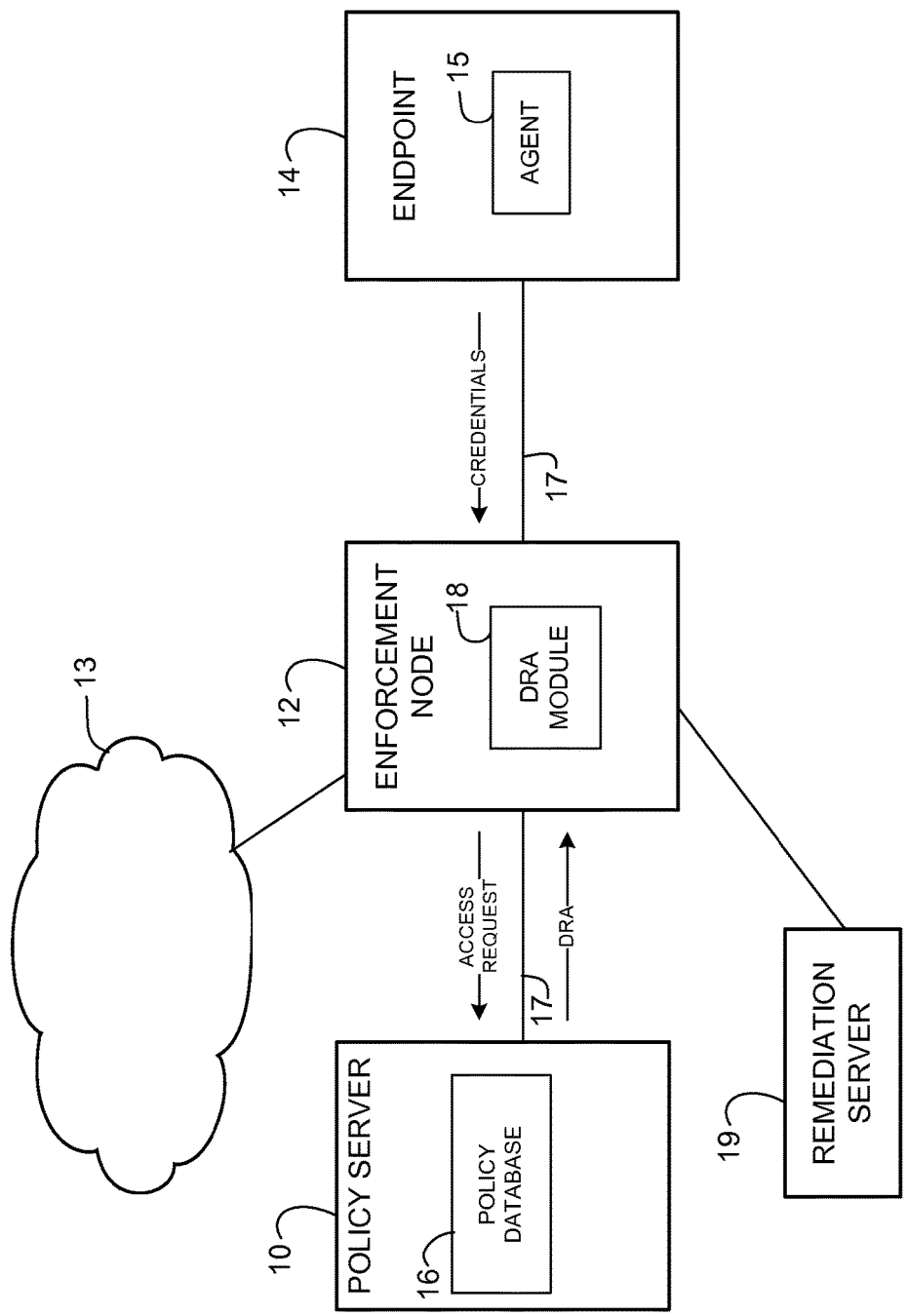
FIG. 1 illustrates an example of a network in which embodiments described herein may be implemented.

In one embodiment, a method generally comprises receiving at an enforcement node, a request to access a network from an endpoint, transmitting at the enforcement node, the access request to a policy server, receiving at the enforcement node from the policy server, a dynamic authorization comprising a plurality of ranks, each of the ranks comprising a policy for access to the network by the endpoint, assigning the endpoint to one of the ranks and applying the policy associated with the rank to traffic received from the endpoint at the enforcement node during a communication session between the endpoint and the network, assigning the endpoint to a different rank, and applying the policy associated with the rank to traffic received from the endpoint during the communication session.

In another embodiment, an apparatus generally comprises a processor, when operating at the apparatus operable to process a request for an endpoint to access a network, generate a dynamic authorization comprising a plurality of ranks, each of the ranks comprising a policy for access to the network by the endpoint, transmit the dynamic authorization to an enforcement node operable to apply the policy associated with one of the ranks to traffic received from the endpoint and assign a different one of the ranks to the endpoint upon occurrence of a condition at the enforcement node. The apparatus further comprises memory for storing the policies.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Before connecting a client to a secure network, credentials and context information for the client may be sent to a policy server for processing. In conventional systems, the policy server returns a static authorization computed based on information known at the time of authentication and enforced at the point of network attachment or egress firewall to allow or restrict network traffic. For example, an endpoint that is compliant may be statically assigned a full level of access in accordance with the authorization identified at the policy server. If the endpoint is noncompliant, it may be statically assigned a quarantine level of access, which may allow network connectivity to a remediation server, for example. This static authorization remains in effect for the duration of the authentication or until a reauthentication or port-bounce occurs, which results in another authentication request and a new authorization result. Reuathentication and computation of a new authorization may involve multiple communications between the endpoint, enforcement point, and the policy server. This process may be slow and prone to policy server connectivity or availability flaps. It also unnecessarily drains processing resources from the policy server.

In contrast to the static authorization described above, network conditions and security posture may be dynamic. For example, the endpoint may pick up a virus from a USB (Universal Serial Bus) drive inserted after authentication. Conversely, vulnerability identified at an endpoint may be resolved. Thus, a static authorization computed at the time of authentication may not always be a valid assessment of the current state of the endpoint.

The embodiments described herein provide secure network access using dynamic authorization. One or more embodiments dynamically adjust access to a network by an endpoint by demoting or promoting the endpoint based on different situations (e.g., status of endpoint, status of network access device). As described below, a dynamic action plan (referred to herein as dynamic authorization or Dynamic Rank Authorization (DRA)) is provided for each user session. Certain embodiments allow a network access device to locally execute the action plan to change the access permitted to the endpoint upon locally observed conditions. The dynamic authorization may, for example, be provided by a policy server and enforced at a point of access to the network. In one or more embodiments, a plurality of authorization ranks (states, modes, levels, stack) may be downloaded to an enforcement point where network access in accordance with one of the ranks is enforced and rank promotion or demotion criteria is computed dynamically as conditions change. For example, the policy server may define a ranked stack of authorization (dynamic authorization) comprising policies (e.g., ACLs (Access Control Lists), SGTs (Security Group Tags), VLANs (Virtual Local Area Networks), QoS (Quality of Service) settings, and the like) and rules (conditions, criteria) to dynamically promote or demote a client to another rank in the ranked authorization stack. The different ranks allow endpoints an opportunity to complete remediation at various security levels. Certain embodiments may prevent the need for a global periodic health check by the policy server and therefore reduce traffic between the policy server and enforcement node.

Referring now to the drawings, and first to FIG. 1, a network in which embodiments described herein may be implemented is shown. For simplification, only a small number of nodes are shown. The embodiments operate in the context of a data communication network including multiple network devices. The network may include any number of network devices in communication via any number of nodes (e.g., routers, switches, gateways, controllers, access devices, aggregation devices, core nodes, intermediate nodes, or other network devices), which facilitate passage of data within the network. The nodes may communicate over one or more networks (e.g., local area network (LAN), metropolitan area network (MAN), wide area network (WAN), virtual private network (VPN), virtual local area network (VLAN), wireless network, enterprise network, Internet, intranet, radio access network, public switched network, or any other network).

The network shown in the example of FIG. 1 includes a policy server 10 in communication with an enforcement node 12 for use in authorizing clients such as endpoint 14 for communication with a secure network 13. There may be any number of endpoints 14 in communication with the enforcement node 12 and any number of enforcement nodes 12 in communication with one or more networks 13. Also, one or more policy servers 10 may be located within the network 13 or another network.

The endpoint (client, station) 14 may be, for example, a desktop computer, laptop computer, IP (Internet Protocol) phone, server, appliance, game console, printer, camera, sensor, mobile phone, tablet, personal digital assistant, or any other device configured for communication with the enforcement node 12. The client 14 may be a managed or unmanaged device. For example, a user may attempt to access the network 13 from a corporate-managed personal computer, personal network-accessible device, or public terminal. The endpoint 14 may be a wired device or wireless device, or configured for both wired communication (e.g., connected to a docking station) and wireless communication. For example, the endpoint 14 may be in wired or wireless communication with enforcement node 12 (or another node such as an access point) via link 17 (one or more communication paths), as shown in FIG. 1.

The endpoint 14 may include an agent 15 comprising networking software (e.g., connectivity agent such as Any-Connect) running on the endpoint hardware to gather credentials (e.g., username, password) and other contextual information (e.g., MAC (Media Access Control) address, location, OS (Operating System), antivirus signature, posture), or any combination of this or other data. The credentials may be transmitted to the enforcement node 12 along with an access request when the endpoint 14 wants to access the protected network 13.

The enforcement node 12 may be a network access device such as a switch (e.g., access switch), router, firewall, IPS (Intrusion Prevention System), gateway, or any computer, processor, network appliance, or other suitable device, component, element, or object capable of processing network access requests and enforcing authorization policies. The enforcement node 12 is in communication with the policy server 10 over one or more communication paths 17 comprising any number of intermediate nodes, and over one or more networks. The enforcement node 12 is operable to execute policies defined by the policy server 10.

In one embodiment, the enforcement node 12 comprises a Dynamic Rank Authorization (DRA) module 18 operable to provide dynamic authorization to endpoint 14 upon receiving dynamic authorization information (e.g., ranks, policies, rules, etc.) from policy server 10. The DRA received from the policy server 10 comprises a stack of authorizations with less restrictive level of access as the ranking in the stack promotes. Each ranking may have associated policies and conditions defined for promotion and demotion, as described in detail below.

The enforcement node 12 is operable to assign different ranks to the endpoint 14 during a communication session between the endpoint and the network 13 without reauthentication of the endpoint at the policy server 10. The enforcement node 12 may locally execute the dynamic authorization to change the access permitted to the endpoint 14 upon locally observed situations. For example, when there is an overload or security issue specific to the network access device, the enforcement node 12 may apply the promotion or demotion set by the policy server 10 so that bandwidth or an access perimeter can be scaled back dynamically according to the policy, and do so independently from another network access device that is not having the same issue.

In the example shown in FIG. 1, the enforcement node 12 operates at a network device (e.g., network access device) and receives the DRA from the policy server 10 operating on a separate network device.

In another embodiment, the enforcement node 12 (i.e., node that enforces dynamic authorization) may operate at the same network device as the policy server 10. Thus, the DRA module 18 may reside at the policy server 10, in which case the DRA is transmitted between the policy node and the enforcement node residing at the same network device so that dynamic authorization is performed at the policy server. This allows the policy server 10 to provide dynamic authorization for endpoints 14 in communication with an enforcement point that is not configured for DRA. Thus, the term "enforcement node" as used herein may refer to a network access device (e.g., switch, firewall, gateway) or module located at another network device.

The policy server 10 may be any network device operable to provide policies for network access to one or more networks 13. For example, the policy server 10 may be an identity and access control policy platform that enables enterprises to enforce compliance and enhance infrastructure security (e.g., Identity Services Engine (ISE)). The policy server 10 may include, for example, one or more access directory, access control server, AAA (authentication, authorization and accounting) server/proxy, application server, controller, security manager, client profile manager, or any other node, combination of nodes, or source (e.g., network administrator) that provides authentication or policy information for the clients 14. The authentication server may use, for example IEEE 802.1x (Port Based Network Access Control), EAP (Extensible Authentication Protocol), EAPoUDP (EAP over User Datagram Protocol), Web Portal authentication, RADIUS (Remote Authentication Dial in User Service), Diameter, or any other authentication scheme. The policy server 10 may also provide support for discovery, profiling, and accessing device posture for endpoint devices 14. Security policy may be defined on the policy server by a security manager, for example. The policy server 10 may be a computer, processor, network appliance, or other suitable device, component, element, or object capable of performing operations described herein.

The policy server 10 may comprise a policy engine (not shown) and one or more databases including policy database 16, which may be located at the same network device or another network device. Thus, the term "policy server" as used herein may refer to one or more network devices or a distributed platform. As described in detail below, the policy database 16 includes dynamic authorization policies that may be used to provide a ranked stack of authorization. In one embodiment, the policy server 10 transmits an authorization action plan in the form of promotion and demotion through a stack encapsulation (DRA). The dynamic authorization sent from the policy server 10 to the enforcement node 12 may include, for example, policies that are applied to the endpoint 14 at each rank and the rules (e.g., time triggers or other conditions) for promotion and demotion. The enforcement node 12 may carry out the promotion and demotion to different ranks of authorization as conditions are met. The conditions may include, for example, expiration of a time interval or identification of a state (e.g., compliant, noncompliant, remediated) of the endpoint 14 at the enforcement node 12, as described further below.

The network may also include a remediation server 19 to provide resources used to bring a noncompliant client 14 into compliance with administrator defined client health policy. The remediation server 19 may host updates that the agent 15 installed at the endpoint 14 may use to bring noncompliant client computers into compliance with policies defined by the policy server 10. For example, the remediation server 19 may host antivirus signatures and if policy specifies that the client computer 14 needs to have the latest antivirus definitions installed, the remediation server (or other server used to host the antivirus signatures) may work with the agent 15 to update the noncompliant computer. The remediation server 19 may be a standalone device or located at another node (e.g., policy server 10, enforcement node 12) in the network 13 or another network.

It is to be understood that the network shown in FIG. 1 and described above is only an example and the embodiments described herein may be implemented in networks comprising different network topologies or network devices, or using different protocols, without departing from the scope of the embodiments. For example, the network may include any number or type of network devices that facilitate passage of data over the network (e.g., routers, switches, gateways, controllers), network elements that operate as endpoints or hosts (e.g., servers, virtual machines, clients), and any number of network sites in communication with any number of networks. Thus, network nodes may be used in any suitable network topology, which may include any number of servers, accelerators, virtual machines, switches, routers, or other nodes interconnected to form a large and complex network. Nodes may be coupled to other nodes through one or more interfaces employing any suitable wired or wireless connection, which provides a viable pathway for electronic communications.

Figure 2:
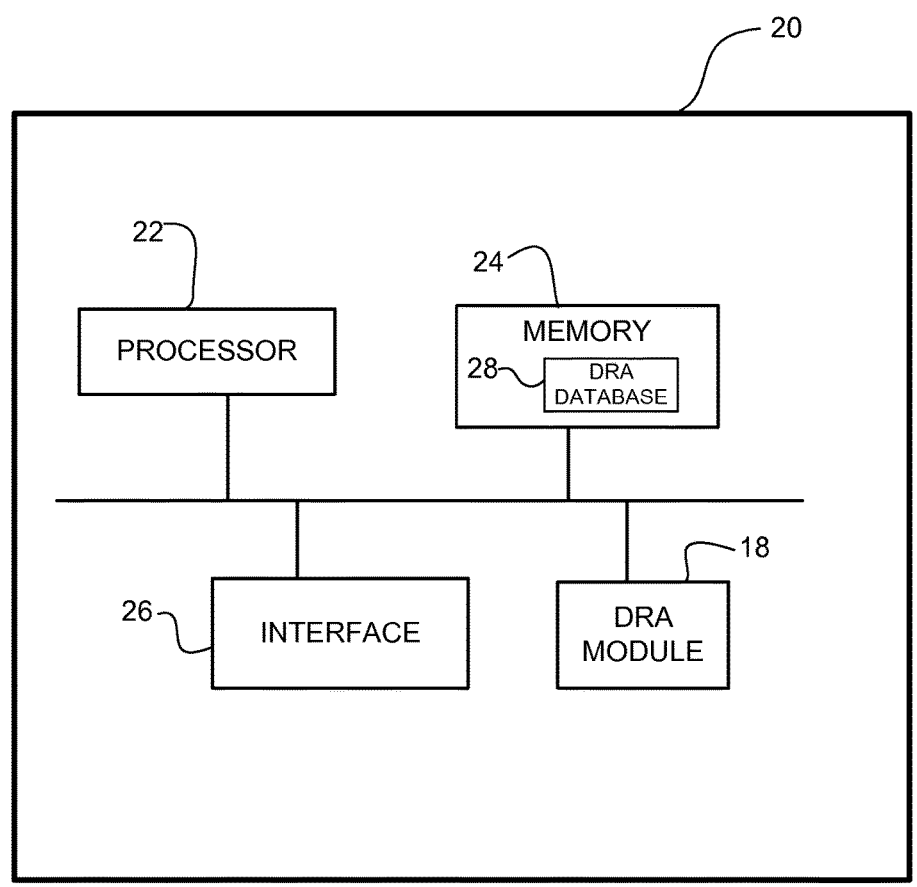
FIG. 2 depicts an example of a network device useful in implementing embodiments described herein.

FIG. 2 illustrates an example of a network device 20 (e.g., enforcement node 12 in FIG. 1) that may be used to implement the embodiments described herein. In one embodiment, the network device 20 is a programmable machine that may be implemented in hardware, software, or any combination thereof. The network device 20 includes one or more processor 22, memory 24, network interface 26, and DRA module 18 (e.g., hardware, software components).

Memory 24 may be a volatile memory or non-volatile storage, which stores various applications, operating systems, modules, and data for execution and use by the processor 22. Memory 24 may include, for example, one or more databases (e.g., DRA database 28), access database or list, policy table, or any other data structure configured for storing policies, conditions, rules, access information, or user information. The DRA database 28 may include, for example, a stack of ranked dynamic authorizations for one or more user sessions, conditions for promotion or demotion between ranks, policies associated with each rank, etc. One or more components of the DRA module 18 (e.g., code, logic, software, firmware, etc.) may also be stored in memory 24. The network device 20 may include any number of memory components.

Logic may be encoded in one or more tangible media for execution by the processor 22. The processor 22 may be configured to implement one or more of the functions described herein. For example, the processor 22 may execute codes stored in a computer-readable medium such as memory 24 to perform the process described below with respect to FIG. 3. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 20 may include any number of processors 22.

The network interface 26 may comprise any number of interfaces (linecards, ports) for receiving data or transmitting data to other devices. The network interface 26 may include, for example, an Ethernet interface for connection to a computer or network. The network interface 26 may be configured to transmit or receive data using a variety of different communication protocols. The interface 26 may include mechanical, electrical, and signaling circuitry for communicating data over physical links coupled to the network.

It is to be understood that the network device 20 shown in FIG. 2 and described above is only an example and that different configurations of network devices may be used. For example, the network device 20 may further include any suitable combination of hardware, software, algorithms, processors, devices, components, modules, or elements operable to facilitate the capabilities described herein.

Figure 3:
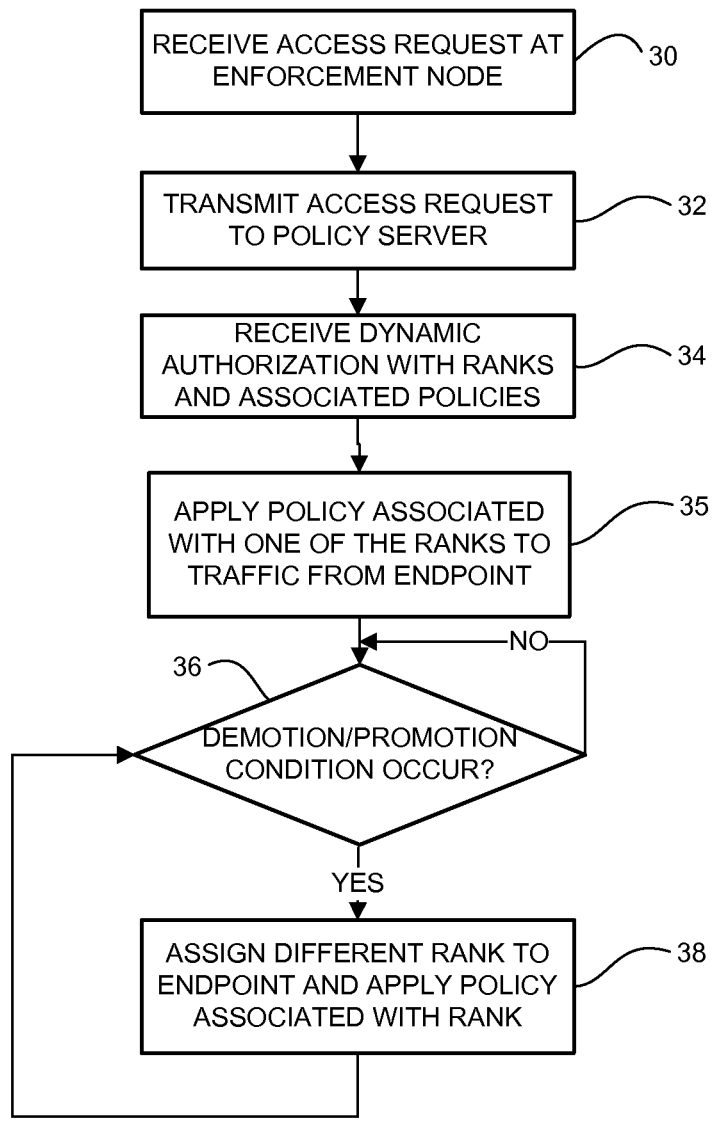
FIG. 3 illustrates an overview of a process for dynamic authorization, in accordance with one embodiment.

FIG. 3 is a flowchart illustrating an overview of a process for dynamic authorization, in accordance with one embodiment. At step 30, a network device (e.g., enforcement node 12) receives a request to access network 13 from endpoint 14 (FIG. 1). The access request may include user (client, endpoint) credentials or other contextual information for use in authorizing or authenticating the client. The enforcement node 12 forwards the access request to the policy server 10 (step 32). In response to the access request, the enforcement node 12 receives a dynamic authorization comprising a plurality of ranks for use in authorizing the endpoint (step 34). Each of the ranks comprises policies (e.g., ACL, VLAN, and QoS attributes) for access to the network by the endpoint 14 and rules for promoting or demoting the endpoints to different ranks. The enforcement node 12 applies the policies associated with one of the ranks to traffic received from the endpoint 14 during a communication session between the endpoint 14 and the network 13 (step 35). If a demotion or promotion condition occurs (e.g., timer expires, endpoint state identified as compliant, noncompliant, or remediated) (step 36), the enforcement node 12 assigns the endpoint 14 to a different rank and applies policies associated with that rank (step 38). For example, if the endpoint 14 is compliant with conditions for network access, the endpoint will be allowed to access the network and may be assigned an access rank. After the endpoint 14 is permitted access to the network 13 following the initial authorization, the rank of the endpoint may dynamically change during the session in which the endpoint is in communication with the network, without any action taken by the policy server.

As described in detail below, the client 14 may be assigned a rank based on the initial authorization and dynamically moved between ranks (e.g., access, quarantine, blacklist) following reassessment at periodic intervals. For example, the endpoint 14 may be demoted to a lower rank if the endpoint is found to be noncompliant (e.g., demoted to quarantine and then blacklisted) and may be promoted to a higher rank (e.g., access) if the endpoint is later found to be compliant (e.g., endpoint remediated).

It is to be understood that the process shown in FIG. 3 and described above, is only an example and that steps may be added, deleted, combined, or modified without departing from the scope of the embodiments. For example, as previously noted the policy server 10 may perform the dynamic rank authorization process and therefore operate as the enforcement node for DRA. In this case, the DRA module may operate at the same network device as the policy server, with the DRA stack transmitted from the policy server to the DRA module within the network device. Also, it may be noted that the processor 22 shown in FIG. 2 or the DRA module 18 shown in FIG. 1 (or a combination thereof) may implement one or more of the steps shown in FIG. 3 and described herein. For example, logic encoded on a computer readable media and executed by the processor 22 may be operable to perform one or more steps shown in FIG. 3 and described herein.

Figure 4:
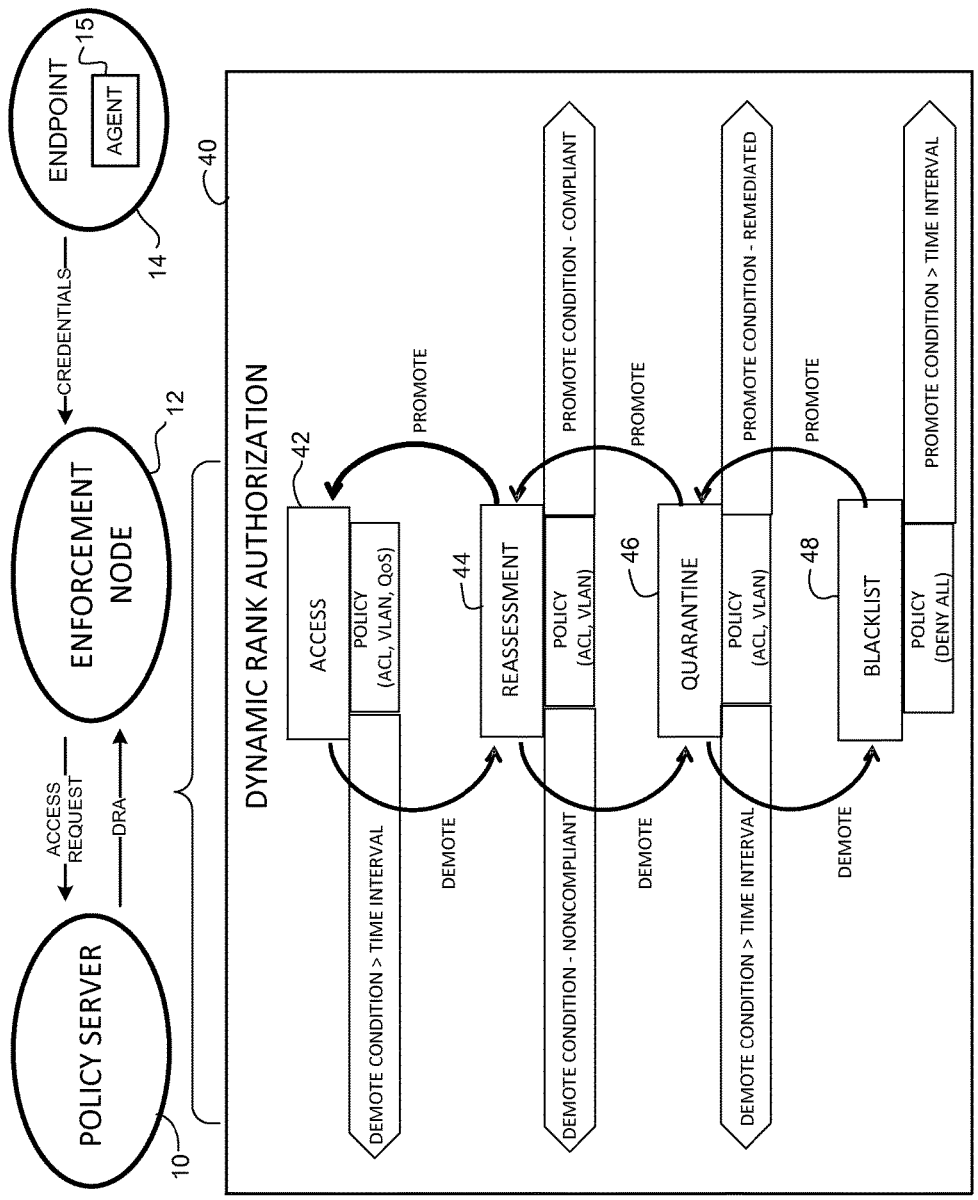
FIG. 4 illustrates an example of a dynamic rank authorization, in accordance with one embodiment.

FIG. 4 illustrates an example of a dynamic rank authorization, in accordance with one embodiment. When a user first attempts to connect the endpoint 14 to the network 13, the enforcement point 12 exchanges messages with the agent 15 to gather credentials and other contextual information (FIGS. 1 and 4). The enforcement node 12 then sends an access request to the policy server 10, which includes the user's credentials and other information obtained by the enforcement node 12.

The policy server 10 evaluates the information 14 received from the enforcement node 12 and returns a response that includes a dynamic authorization 40 (FIG. 4). In the example shown in FIG. 4, the dynamic authorization 40 includes a plurality of ranks (access 42, reassessment 44, quarantine 46, and blacklist 48) and a policy for each rank. Each rank may comprise a different policy (e.g., ACL, VLAN, etc.). The dynamic authorization 40 also includes conditions for moving (changing, shifting, transferring) the endpoint 14 between ranks. The conditions shown in FIG. 4 include a time interval or a state of the endpoint (e.g., compliant, noncompliant, remediated).

It is to be understood that the DRA 40 shown in FIG. 4 is only an example and that other ranks (e.g., more ranks, less ranks, different ranks) may be used or different demotion or promotion conditions may be used without departing from the scope of the embodiments.

If the endpoint 14 is compliant, the dynamic authorization 40 includes a current rank or stack pointer that initially points to an access rank 42. Since the authorization is dynamic, the endpoint 14 does not remain at the access rank. After a specified interval or period of time (e.g., 5 minutes, 10 minutes, 15 minutes, 30 minutes, 60 minutes, or any other time interval), the endpoint 14 is demoted to a lower reassessment rank 44. The demotion condition (e.g., time interval) may be configurable on the policy server 10 and downloaded to the enforcement point with the stacked dynamic authorization ranks, for example.

At the lower rank of reassessment 44, the enforcement node 12 may limit traffic to posture assessment and captive HTTPS (Hypertext Transfer Protocol Secure) traffic to indicate that posture assessment is to be run by the agent 15 on the endpoint 14, in addition to using the user agent to identify the endpoint. The agent 15 may then attempt an outbound HTTPS connection with its own manufacturing burn in a certificate as payload. Mutual validation may be performed among the enforcement node 12 and agent 15 to ensure validity. The HTTPS attributes that the enforcement node 12 returns to the agent 15 may include, for example, a session token identifying the endpoint network session.

While the endpoint 14 is in the reassessment phase, the ACL (Access Control List) or SGT (Security Group Tag) may be set to more restrictive access, depending on an organization's security sensitivity. This is not a flat network outage but instead access to secure servers or sensitive areas may be blocked based on the DRA profile pushed by the policy server 10. When a redirect is seen by an assessment agent, the agent is triggered to perform the assessment and also provide feedback to the user that it is reassessing.

If the reassessment result is noncompliant (e.g., nonconforming files or registry keys identified, incorrect software version or operating system, outdated virus protection, virus identified, etc.), the endpoint 14 is moved (demoted) to quarantine rank 46. At this rank, an ACL may be applied that restricts traffic to only the remediation server 19 (FIG. 1). After a specified period of time, another demotion condition may occur and the endpoint demoted to a lower rank of blacklist 48. At this rank, all network access may be blocked for the endpoint 14. The blacklist rank 48 is used to reduce the risk and limit the duration of a potential attack that an infected host poses on the remediation server 19 while at the quarantine rank 46. In one embodiment, the endpoint 14 may go through multiple cycles of quarantine or remediation and dropped to the blacklist only when a number of chances to resolve the issue have been exhausted.

When a promotion condition is met (e.g., timer expired), promotion out of the blacklist rank 48 may take place to assign (move) the endpoint 14 back to the quarantine rank 46 in order for remediation to occur. If remediation is successful (e.g., OS version updated, antivirus software updated, etc.) and the agent rescan found that the endpoint completed remediation, the agent 15 may again attempt an HTTPS connection with the session token and request promotion. The agent rescan may be user triggered or performed periodically. The enforcement node 12 may then identify the URL (Uniform Resource Locator), validate the session token, and promote the endpoint 14 to the reassessment rank 44. A similar process of rescan for compliance is used to promote the rank back to access 42 from the reassessment rank 44.

The enforcement node 12 may be operable to locally evaluate or coordinate on its own to see if the condition specified in the DRA 40 is fulfilled. For example, the enforcement node 12 may perform a posture reassessment to evaluate system security based on applications and settings that a particular endpoint 14 is currently using. The enforcement node 12 may detect that remediation has occurred or that a posture status has changed. Rank promotion or demotion conditions may be learned, for example, via HTTPS exchange with the agent 15 running on the endpoint 14. Other ways that rank promotion or demotion can be triggered include using SXP (SGT Exchange Protocol) or pxGrid (Platform Exchange Grid) API (Application Programming Interface) messages transmitted directly to the enforcement node 12. It is to be understood that these are only examples, and that other conditions may trigger endpoint promotion or demotion to a different rank, without departing from the scope of the embodiments. Also, another node may be used to identify whether or not conditions necessary for promotion have been met at the endpoint 14 and communicate this information to the enforcement node 12.

If there is a need to update the dynamic authorization stack 40 (e.g., change to conditions for promotion/demotion or policy change) after the enforcement node 12 has received the initial DRA in the result of the authentication request, the change may be made on the policy server 10 and a new dynamic authorization 40 or changes to an existing DRA may be sent to the enforcement node 12. In one example, a CoA (Change of Authorization) packet may be used to trigger a reauthentication, and a new DRA delivered in the reauthentication result. In another example a mechanism similar to DACL (downloadable ACL) may be used in which the content of the named DRA is updated with new rule values and downloaded to the enforcement node 12.

The embodiments described herein may also be used to promote or demote service offerings (e.g., bandwidth) at a local network access device while conforming to a global policy to which an individual user, endpoint, or session is entitled. For example, a user may be dynamically promoted to gold level access when the network access device is not serving much traffic, if the individual is entitled to the promotion. Dynamic demotion may also occur when the network access device is overloaded, not across the board but based on a specific plan defined in the dynamic authorization. This may be adjusted at the network access device according to a policy defined in the dynamic authorization and downloaded from the policy server 10, for example. Since the authorization is dynamically applied at the enforcement node 12 based on the DRA provided by the policy server 10, the policy server does not need to have visibility or intervention into local network access device conditions.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving at an enforcement node, a request to access a network from an endpoint;
   transmitting at the enforcement node, the access request to a policy server;
   receiving at the enforcement node from the policy server, a dynamic authorization for a communication session between the endpoint and the network, the dynamic authorization comprising a plurality of ranks and a policy for access to the network by the endpoint during the communication session for each of said ranks;
   assigning the endpoint to one of said ranks and applying said policy associated with said rank to traffic received from the endpoint at the enforcement node during the communication session between the endpoint and the network; and
   assigning the endpoint to a different one of said ranks and applying said policy associated with said rank to the traffic received from the endpoint during the communication session between the endpoint and the network without reauthentication of the endpoint;
   wherein assigning comprises dynamically promoting or demoting the endpoint to a different one of said ranks.

2. The method of claim 1 further comprising receiving from the policy server a plurality of conditions for moving the endpoint from one of said ranks to another of said ranks.

3. The method of claim 2 wherein at least one of the conditions comprises expiration of a time interval.

4. The method of claim 2 wherein at least one of the conditions comprises identifying a state of the endpoint.

5. The method of claim 1 wherein the enforcement node comprises an access device interposed between the endpoint and the network.

6. The method of claim 1 wherein the enforcement node operates at a network device comprising the policy server.

7. The method of claim 1 further comprising periodically reassessing the endpoint at the enforcement node.

8. The method of claim 1 further comprising identifying noncompliance of the endpoint and wherein assigning the endpoint to said different one of the ranks comprises demoting the endpoint to a quarantine rank at the enforcement node.

9. The method of claim 8 further comprising identifying a resolution of the noncompliance at the endpoint and promoting the endpoint to an access rank at the enforcement node.

10. The method of claim 8 further comprising demoting the endpoint to a blacklist rank in which all communication between the endpoint and the network is denied, after a specified time interval.

11. An apparatus comprising:
    a processor, when operating at the apparatus operable to process a request for an endpoint to access a network, generate a dynamic authorization comprising a plurality of ranks and a policy for access to the network by the endpoint for each of said ranks, transmit the dynamic authorization to an enforcement node operable to apply said policy associated with one of said ranks to traffic received from the endpoint and dynamically promote or demote the endpoint to a different one of said ranks upon occurrence of a condition at the enforcement node without reauthentication of the endpoint; and
    memory for storing said policies.

12. The apparatus of claim 11 wherein the dynamic authorization comprises the condition for assigning the endpoint to said different one of said ranks.

13. The apparatus of claim 11 wherein the condition comprises expiration of a time interval.

14. The apparatus of claim 11 wherein the condition comprises identifying a compliance or noncompliance state at the endpoint.

15. The apparatus of claim 11 wherein said plurality of ranks comprises an access rank and a quarantine rank.

16. Logic encoded on one or more non-transitory computer readable media for execution and when executed on a processor operable to:
    transmit a request from an endpoint to access a network to a policy server;
    process a dynamic authorization received from the policy server and comprising a plurality of ranks for a communication session between the endpoint and the network and a policy for access to the network by the endpoint during the communication session for each of said ranks;

assign the endpoint to one of said ranks and apply said policy associated with said rank to traffic received from the endpoint at the enforcement node during a communication session between the endpoint and the network; and promote or demote the endpoint to a different one of said ranks and apply said policy associated with said rank to the traffic received from the endpoint during the communication session between the endpoint and the network without reauthentication of the endpoint.

17. The logic of claim 16 wherein the logic is further operable to process a plurality of conditions for moving the endpoint from one of said ranks to another of said ranks, received from the policy server.

18. The logic of claim 17 wherein at least one of the conditions comprises expiration of a time interval.

19. The logic of claim 17 wherein at least one of the conditions comprises identifying a state of the endpoint.

20. The logic of claim 16 further operable to identify noncompliance of the endpoint and demote the endpoint to a quarantine rank at the enforcement node.

* * * * *